(12) United States Patent
Maddox et al.

(10) Patent No.: US 11,060,746 B2
(45) Date of Patent: Jul. 13, 2021

(54) SYSTEMS AND METHODS FOR DETECTING AND RESPONDING TO REFRIGERANT LEAKS IN HEATING, VENTILATING, AND AIR CONDITIONING SYSTEMS

(71) Applicant: Johnson Controls Technology Company, Auburn Hills, MI (US)

(72) Inventors: Steven M. Maddox, Elmond, OK (US); William F. McQuade, New Cumberland, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 563 days.

(21) Appl. No.: 15/874,630

(22) Filed: Jan. 18, 2018

(65) Prior Publication Data

US 2019/0170385 A1    Jun. 6, 2019

Related U.S. Application Data

(60) Provisional application No. 62/593,585, filed on Dec. 1, 2017.

(51) Int. Cl.
| | | |
|---|---|---|
| *F24F 11/00* | (2018.01) | |
| *F24F 11/36* | (2018.01) | |
| *F24F 1/022* | (2019.01) | |
| *F24F 11/89* | (2018.01) | |
| *F24F 7/007* | (2006.01) | |
| *F24F 11/72* | (2018.01) | |

(Continued)

(52) U.S. Cl.
CPC ............ *F24F 11/36* (2018.01); *F24F 1/0035* (2019.02); *F24F 1/0041* (2019.02); *F24F 1/022* (2013.01); *F24F 7/007* (2013.01); *F24F 11/70* (2018.01); *F24F 11/72* (2018.01); *F24F 11/89* (2018.01); *F24F 2110/65* (2018.01)

(58) Field of Classification Search
CPC ...... F24F 1/0035; F24F 1/0038; F24F 1/0041; F24F 1/022; F24F 2011/0002; F24F 11/89; F24F 11/70; F24F 11/72; F24F 2110/65; F24F 11/36
USPC .................................................. 454/238–239
See application file for complete search history.

(56) References Cited

U.S. PATENT DOCUMENTS

| | | |
|---|---|---|
| 6,912,860 B2 | 7/2005 | Zima et al. |
| 8,147,302 B2 | 4/2012 | Desrochers et al. |

(Continued)

FOREIGN PATENT DOCUMENTS

| | | |
|---|---|---|
| WO | 2017083336 | 5/2017 |
| WO | 2017109932 | 6/2017 |

*Primary Examiner* — Vivek K Shirsat
*Assistant Examiner* — Ko-Wei Lin
(74) *Attorney, Agent, or Firm* — Fletcher Yoder, P.C.

(57) ABSTRACT

The present disclosure relates to a heating, ventilating, and air conditioning (HVAC) system that includes a refrigerant circuit and a sensor configured to measure a refrigerant concentration external to the refrigeration circuit. The HVAC system also includes a controller that is communicatively coupled to the sensor and to an economizer. The controller is configured to control a flow of environmental air into the HVAC system. The controller is further configured to increase a ratio of the flow of environmental air relative to a flow of return air from a conditioned interior space of a building when the sensor measures the refrigerant concentration above a predetermined threshold concentration.

8 Claims, 7 Drawing Sheets

(51) Int. Cl.
*F24F 11/70* (2018.01)
*F24F 1/0035* (2019.01)
*F24F 1/0041* (2019.01)
*F24F 110/65* (2018.01)

(56) References Cited

U.S. PATENT DOCUMENTS

| | | | |
|---|---|---|---|
| 9,033,776 B2* | 5/2015 | Kinoshita | F24F 11/0001 454/184 |
| 2008/0076346 A1* | 3/2008 | Ahmed | F24F 11/30 454/256 |
| 2009/0107157 A1 | 4/2009 | Dube | |
| 2015/0065030 A1* | 3/2015 | Kates | H04B 1/69 454/257 |
| 2016/0123615 A1* | 5/2016 | Mikulica | F24F 11/30 165/250 |
| 2016/0178229 A1* | 6/2016 | Chen | F24F 11/30 62/56 |
| 2016/0363358 A1* | 12/2016 | Papas | F25B 49/005 |
| 2017/0146256 A1* | 5/2017 | Alexander | G05B 1/00 |
| 2018/0045424 A1* | 2/2018 | Yajima | F24F 11/30 |

* cited by examiner

SYSTEMS AND METHODS FOR DETECTING AND RESPONDING TO REFRIGERANT LEAKS IN HEATING, VENTILATING, AND AIR CONDITIONING SYSTEMS

CROSS-REFERENCE TO RELATED APPLICATION

This application is a Non-Provisional application claiming priority to U.S. Provisional Application No. 62/593,585, entitled "SYSTEMS AND METHODS FOR DETECTING AND RESPONDING TO REFRIGERANT LEAKS IN HEATING, VENTILATING, AND AIR CONDITIONING SYSTEMS," filed Dec. 1, 2017, which is hereby incorporated by reference in its entirety for all purposes.

BACKGROUND

The present disclosure relates generally to heating, ventilating, and air conditioning (HVAC) systems. A wide range of applications exist for HVAC systems. For example, residential, light commercial, commercial, and industrial HVAC systems are used to control temperatures and air quality in residences and other buildings. Certain HVAC units can be dedicated to either heating or cooling, although many HVAC units are capable of performing both functions. HVAC units may also provide ventilation to a conditioned interior space. In general, HVAC systems operate by implementing a thermodynamic cycle in which a refrigerant undergoes alternating phase changes to remove heat from or deliver heat to a conditioned interior space of a building. Heating may also be provided by heat pumps, gas furnace heat exchangers, electric resistance heat, or steam or hot water coils. Similar systems are used for vehicle cooling, and as well as for other types of general refrigeration, such as refrigerators, freezers, and chillers.

Certain HVAC systems, such as commercial rooftop units, include an HVAC unit having an economizer. For example, an economizer may be implemented as an adjustable vent feature of an outdoor HVAC unit that can be opened to varying degrees, which enables the HVAC unit to add environmental air from outside of a building into the conditioned interior space of the building. That is, the economizer can be controlled to enable the HVAC unit to provide a supply of conditioned air into the building that includes environmental air, air returned from the interior of the building, or any suitable mixture thereof.

The refrigerant of an HVAC unit may be operated at pressures greater than atmospheric pressure. As such, when a portion of a refrigeration circuit of an HVAC unit is damaged, this refrigerant may leak from the refrigeration circuit and into the surrounding environment. Depending on the position of the refrigerant leak, the leaked refrigerant may subsequently collect within a casing of the HVAC unit, the connecting ductwork of the overall air distribution system, or mix with the conditioned air supplied to the interior space of the building.

Certain refrigerants may be selected based on their enhanced performance within the closed refrigeration circuit. Additionally, traditional leak inspection systems may generally only be provided to inspect the refrigerant in the closed refrigeration circuit during or immediately following installation of the HVAC system. Inasmuch as refrigerant leaks compromise system performance or result in increased costs, it is accordingly desirable to provide detection and response systems and methods for the HVAC system to reliably detect and respond to any refrigerant leaks of the HVAC system.

SUMMARY

The present disclosure relates to a heating, ventilating, and air conditioning (HVAC) system that includes a refrigerant circuit and a sensor configured to measure a refrigerant concentration external to the refrigeration circuit. The HVAC system also includes a controller that is communicatively coupled to the sensor and to an economizer. The controller is configured to control a flow of environmental air into the HVAC system. The controller is further configured to increase a ratio of the flow of environmental air relative to a flow of return air from a conditioned interior space of a building when the sensor measures the refrigerant concentration above a predetermined threshold concentration.

The present disclosure also relates to a heating, ventilating, and air conditioning (HVAC) system that includes an economizer that is configured to control a flow of environmental air into the HVAC system, a sensor configured to measure a leaked refrigerant concentration within the HVAC system, and a controller that is communicatively coupled to the sensor and the economizer. The controller is configured to increase a ratio of the flow of environmental air relative to a flow of return air from a conditioned interior space of the building when the sensor measures the leaked refrigerant concentration above a predetermined threshold concentration.

The present disclosure further relates to a method of controlling a packaged heating, ventilating, and air conditioning (HVAC) system having an economizer that controls a flow of environmental air into the HVAC system. The method includes measuring a concentration of leaked refrigerant near a packaged HVAC unit of the HVAC system or within ductwork of the HVAC system and, in response to determining that the measured concentration of leaked refrigerant is above a predetermined threshold value, adjusting the economizer to increase a ratio of the flow of environmental air to a flow of return air supplied by the HVAC system.

DETAILED DESCRIPTION

The present disclosure is directed to HVAC systems having an outdoor HVAC unit that includes an economizer. As mentioned, the economizer enables an HVAC unit to collect environmental air from the outside of a building, and to introduce this air into a conditioned interior space of the building. More specifically, the present disclosure relates to detecting and responding to refrigerant leaks that may occur in HVAC units having economizers. As set forth below, present embodiments generally involve particular control strategies in which an HVAC controller instructs an outdoor HVAC unit to activate or modify operation of an economizer to increase a flow of environmental air into the conditioned interior space of the building in response to detecting a refrigerant leak. Additionally, as air pressure in the conditioned interior space of the building rises, air from the conditioned interior space may exit the building and/or the outdoor HVAC unit as exhaust air. Accordingly, by introducing additional environmental air into the HVAC system and building, the presently disclosed control strategy effectively removes the leaked refrigerant from the HVAC system and the conditioned interior space of the building.

Figure 1:
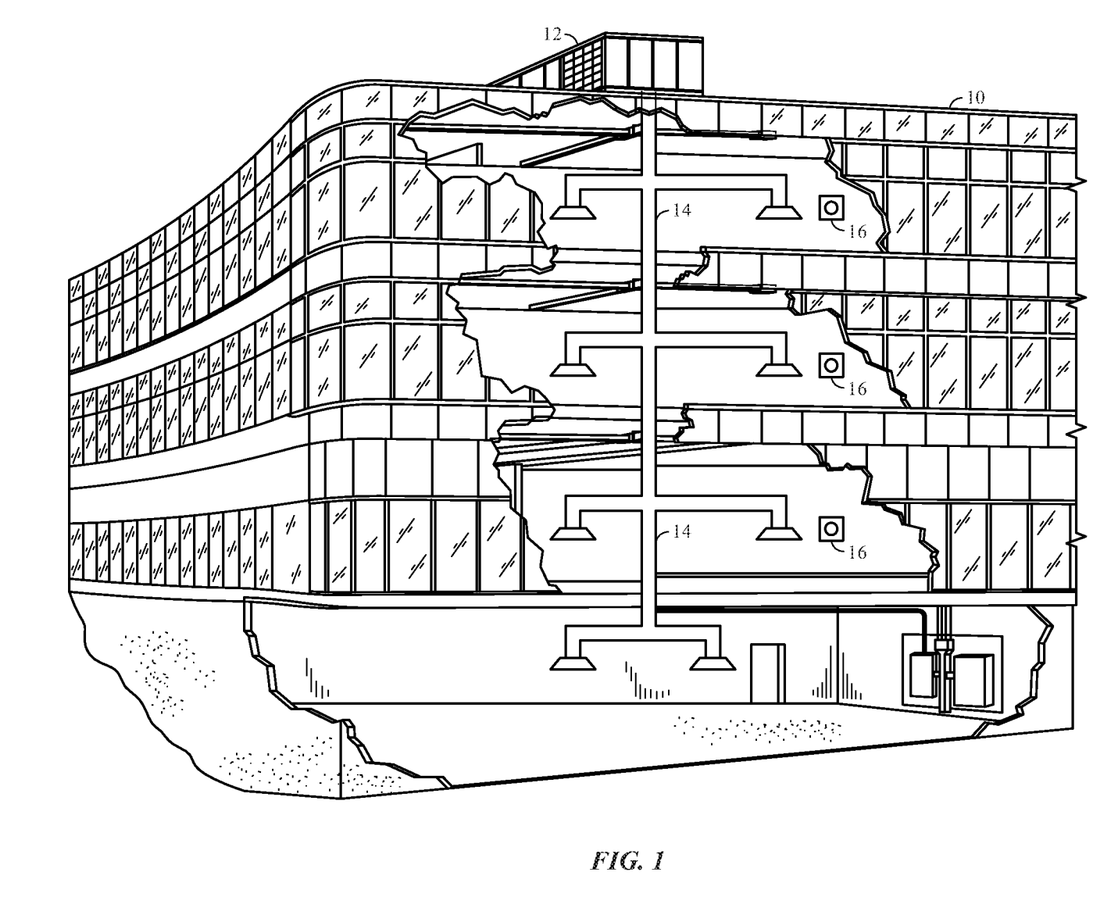
FIG. 1 is a perspective view a heating, ventilating, and air conditioning (HVAC) system for building environmental management, in accordance with embodiments described herein.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
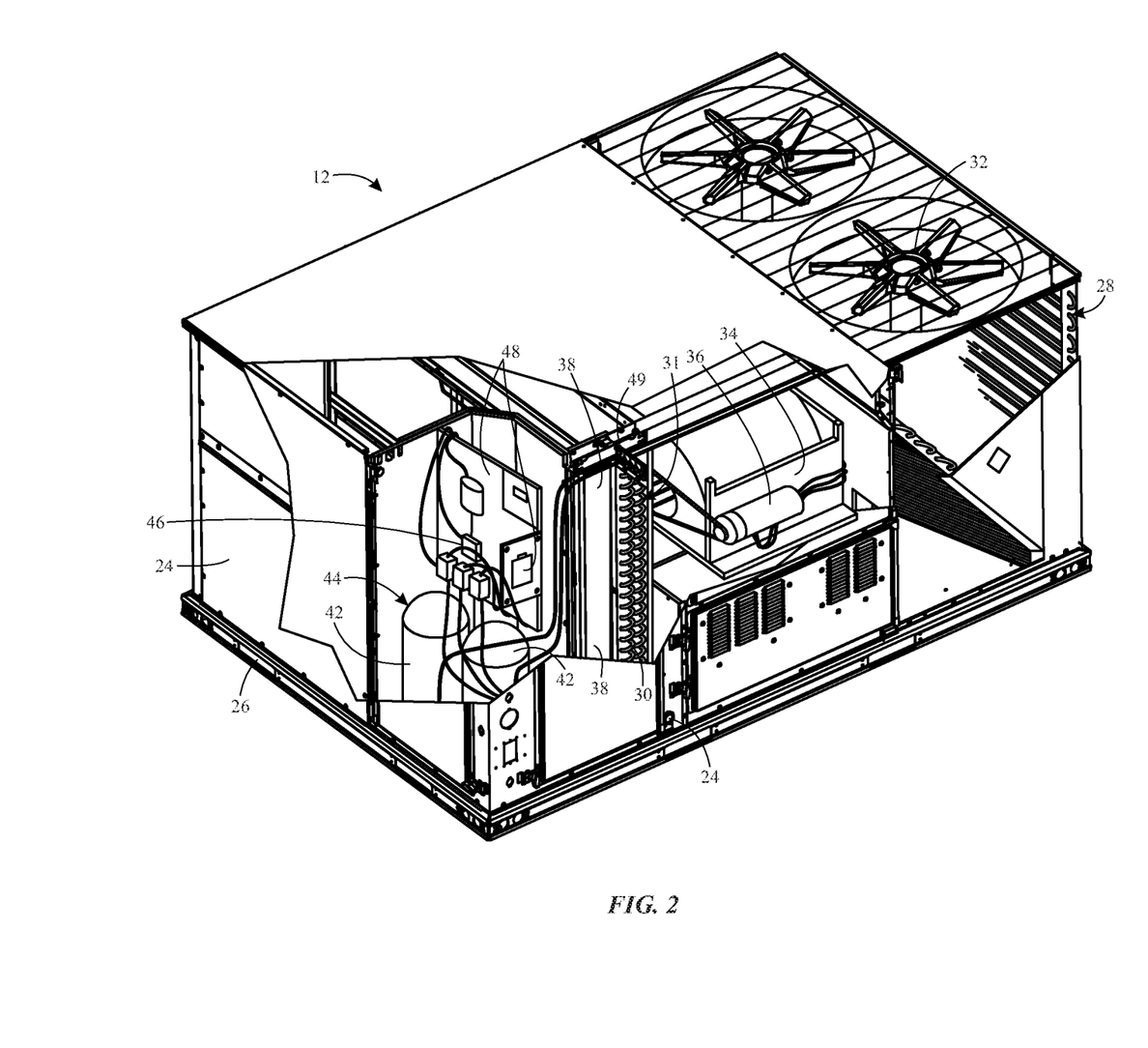
FIG. 2 is a perspective view of the packaged HVAC unit of the HVAC system of FIG. 1, in accordance with embodiments described herein.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel and/or microchannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
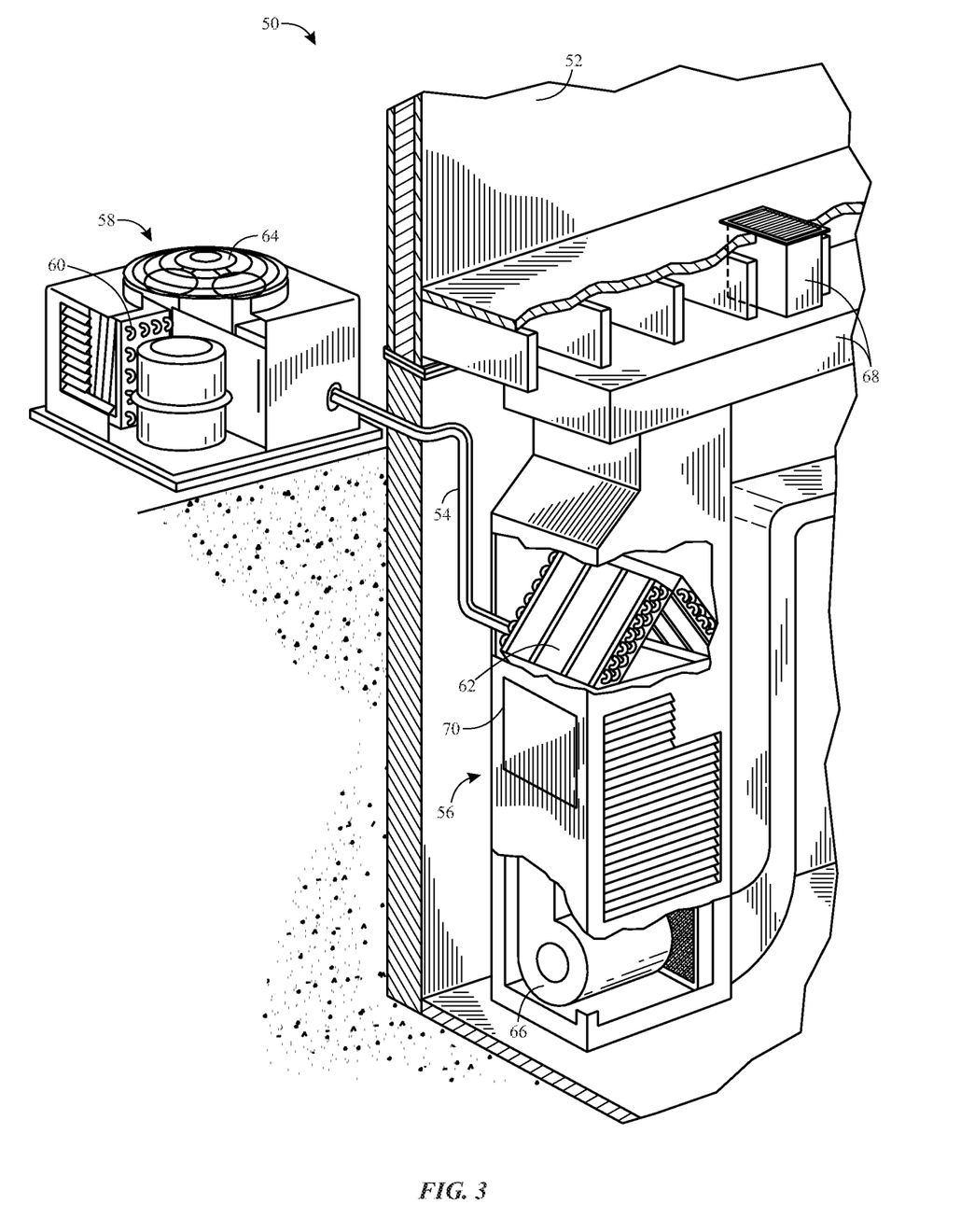
FIG. 3 is a perspective view of a residential HVAC system, in accordance with embodiments described herein.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
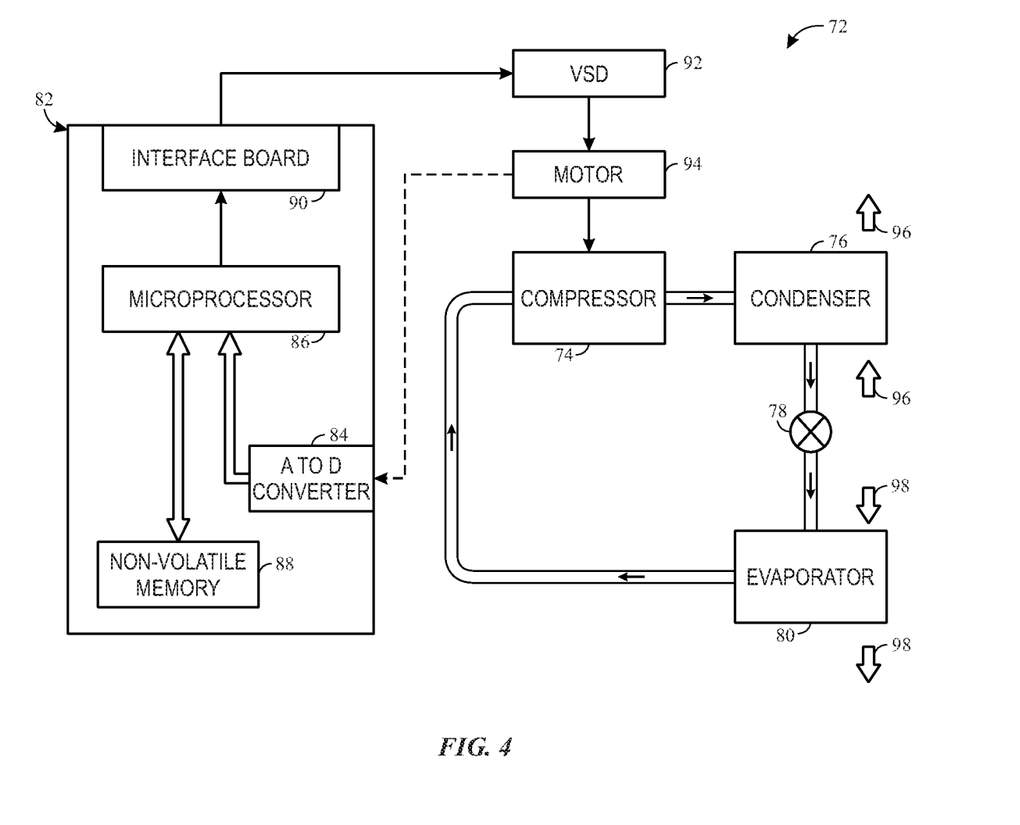
FIG. 4 is a schematic diagram of a vapor compression system that may be used in the packaged HVAC system of FIG. 2 and the residential HVAC system FIG. 3, in accordance with embodiments described herein.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed above, HVAC units such as HVAC unit 12 may include refrigerant that is used to condition air before the conditioned air is sent to a conditioned space, such as a conditioned interior space of building 10. Additionally, as mentioned, the HVAC unit 12 may also include an economizer. As used herein, an "economizer" is a controlled ventilation mechanism, such as a dampered vent, that controls a flow of air between an interior space of an air handling unit or conditioned space and an external environment. For example, the HVAC unit 12 may include an economizer that has a damper that opens to varying degrees, based on control signals from a controller, to allow environmental air to mix with return air from the conditioned space. As such, particularly on fair weather days, an economizer generally increases the efficiency of the HVAC unit 12. In other embodiments, ductwork 14 of the building 10 may include an economizer. As discussed below, the economizer may also be utilized to draw environmental air into a conditioned space in response to a detected refrigerant leak. More specifically, a ratio of environmental air to return air may be increased in the response to the potential leak. It should further be noted that techniques of the present disclosure may be performed by HVAC systems that include a single package unit HVAC unit. As used herein, the terms "single package unit" and "packaged unit" refer to an HVAC unit that is typically located outdoors, such as on a rooftop or side of a building. Additionally, unlike typical residential units, packaged HVAC units generally include both the evaporator and condenser within a single enclosure. By way of specific example, rooftop HVAC units, such as HVAC unit 12 discussed above with respect to FIGS. 1 and 2, are referred to herein as packaged units and may include an economizer.

Furthermore, as also discussed above, the HVAC unit 12 includes refrigerant that is used to condition air before the conditioned air is sent to a conditioned space, such as a conditioned interior space of building 10. For example, the refrigerant may be or include R-32, R-452B, R-134A, R-447A, R-455A, R-1234ze, R-1234yf, R-454A, R-454C, R-454B, or another suitable refrigerant. Under certain circumstances, the refrigerant may inadvertently leak from a component or a flow path of the closed refrigeration circuit due to wear or damage to components, or faulty joints or connections within the closed refrigeration circuit. The present techniques enable the HVAC system to reliably detect and manage the leak of the refrigerant.

Figure 5:
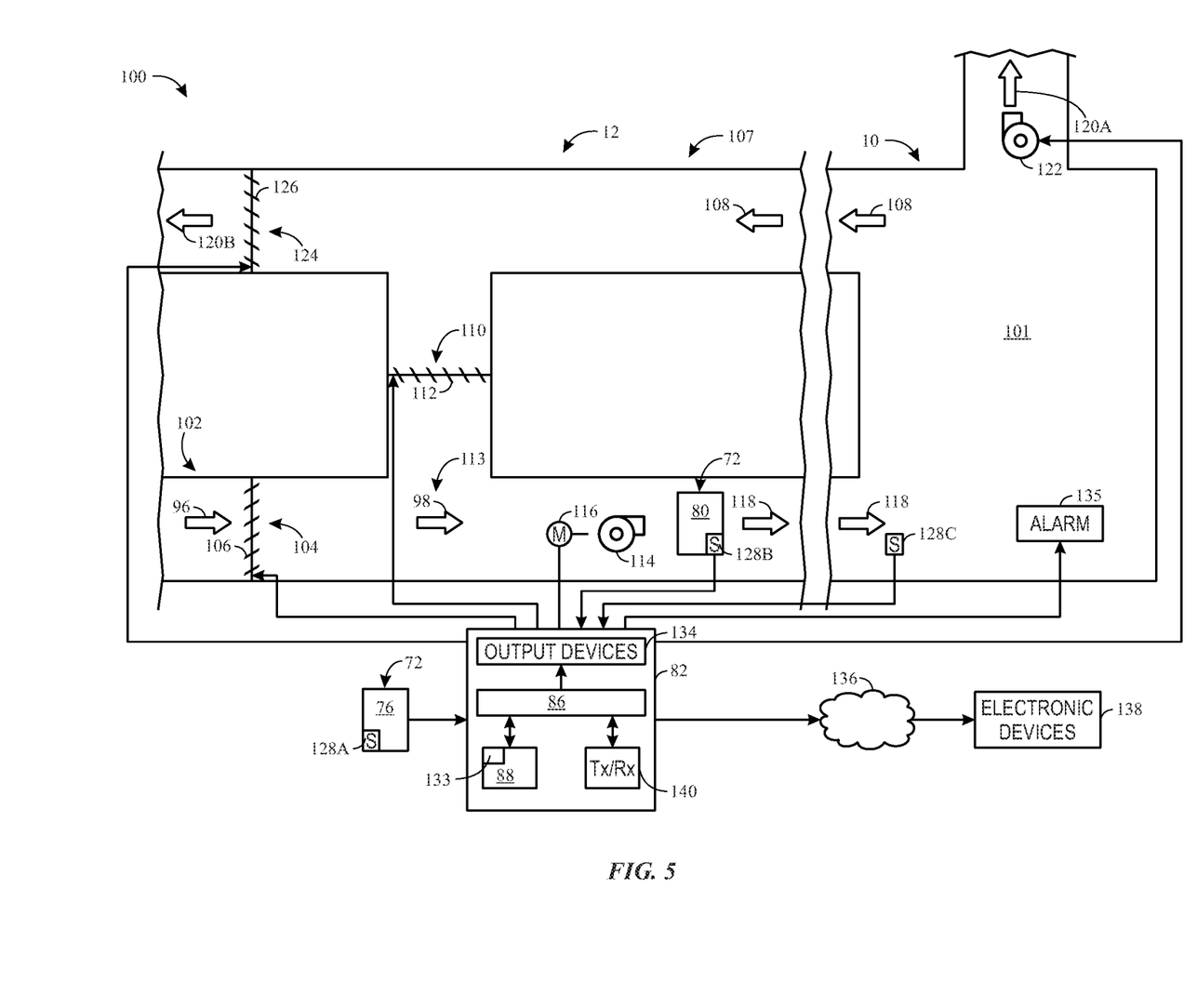
FIG. 5 is a schematic diagram of an HVAC system that includes an outdoor unit having an economizer, in accordance with embodiments described herein.

With the foregoing discussion in mind, FIG. 5 is a schematic diagram of a portion of an HVAC system 100. The illustrated HVAC system 100 includes HVAC unit 12, which is a packaged HVAC unit that provides conditioned air to the conditioned interior space 101 of the building 10. While, in the illustrated embodiment, the outdoor HVAC system 100 includes a single HVAC unit 12, in other embodiments, the outdoor HVAC system 100 may include more than one packaged HVAC unit 12.

As discussed, the HVAC unit 12 includes an economizer 102. For the embodiment illustrated in FIG. 5, the economizer 102 includes a damper 104 having baffles 106 that are adjusted in response to signals from a suitable controller to enable a controlled flow of environmental air 96 into an air handler 107 of the HVAC unit 12 to provide environmental air 96 to the building 10. For instance, the baffles 106 of the damper 104 may be adjusted between a fully open position that allows a maximum amount of environmental air 96 into the HVAC unit 12 and a fully closed position to block environmental air 96 from entering the air handler 107 of the HVAC unit 12 via the economizer 102. Additionally, the damper 104 may be adjusted to any position between fully opened and fully closed. For example, the control panel 82, via processor 86, may send signals that cause the baffles 106 to be adjusted to a specific position based on the heating, cooling, and/or ventilation demands of the building 10. For instance, in embodiments in which the baffles 106 are adjusted by an actuator, the control panel 82 may send a signal to the actuator that causes the actuator to adjust the baffles 106 to a specific position, such as fully- or partially-opened, or fully- or partially-closed. As described in greater detail below, the damper 104 of the economizer 102 can be instructed to adjust to a fully open position in response to a detected refrigerant leak to enable a high flow rate of environmental air 96 to enter the air handler 107 of the HVAC unit 12 and the conditioned interior space 101 of the building 10.

As illustrated in FIG. 5, return air 108 enters the HVAC unit 12 from the conditioned interior space 101 of the building 10. For example, as shown in the illustrated embodiment, the return air 108 may pass through a return air damper 110 before entering an area in the HVAC unit 12 in which the return air 108 may mix with environmental air 96 that enters through the damper 104. As with the damper 104 of the economizer 102, the damper 110 includes baffles 112, and the damper 110 and baffles 112 are controlled via the control panel 82. In other embodiments, the damper 110 may be positioned in a different location of the HVAC unit or other flow control elements may be present. For example, in certain embodiments, return air 108 may reenter the air handler 107 of the HVAC unit 12 in an airspace that is shared with the economizer 102, as indicated by the arrow 113. In other embodiments, the HVAC unit 12 may not include the damper 110.

Environmental air 96 that enters the HVAC unit 12 generally mixes with return air 108 to form supply air 98, which may be unconditioned air. However, as noted above, the supply air 98 can include environmental air 96, return air 108, or a combination thereof. For instance, when the damper 104 is completely closed with substantially no environmental air 96 entering the HVAC unit 12, then the supply air 98 would substantially comprise return air 108 only. Supply air 98 is moved via a supply air fan 114 that is powered by a motor 116. As such, the supply air fan 114 motivates the air to exchange heat with the evaporator 80 of vapor compression system 72 to produce conditioned supply air 118. For example, the supply air 98 may be drawn across the condenser 76 to heat the supply air 98, across the evaporator 80 to cool and dehumidify the supply air 98, or a combination thereof. Additionally, during times when the environmental air 96 is at a temperature desired for air inside the building 10, the HVAC unit 12 may not substantially heat or cool the supply air 98. As illustrated, the conditioned supply air 118 may either reenter the HVAC unit 12 as return air 108 or exit the building 10 as exhaust air 120A. For example, as illustrated, a portion of the conditioned supply air 118 is expelled from the building 10 as exhaust air 120A via an exhaust fan 122. In other embodiments, a passive or barometric exhaust damper may be used in place of the illustrated exhaust fan 122 to allow pressure to equalize as additional environmental air is introduced into the conditioned interior space 101 of the building 10.

As illustrated in FIG. 5, in certain embodiments, return air 108 can, additionally or alternatively, exit the HVAC unit 12 as exhaust air 120B. For instance, in the illustrated embodiment, the return air 108 may pass through an exhaust air damper 124 to form exhaust air 120B. Like the dampers discussed above, the illustrated damper 124 includes baffles 126 that are adjusted via control signals from the control panel 82. That is, the processor 86 of the control panel 82 sends signals to adjust the position of the baffles 106 to control the amount of return air 108 that is expelled from the HVAC unit 12 as exhaust air 120B. In other embodiments, the exhaust air damper 124 may be a barometric damper that opens in response to increased pressure in the conditioned interior space 101 of the building 10, particularly when the damper 110 is closed and/or the exhaust flow 120A is not present. Furthermore, in certain embodiments, the HVAC unit 12 may not include the exhaust air damper 124. In other embodiments, the exhaust damper 124 may have a separate fan to facilitate removal of exhaust flow.

The illustrated HVAC system 100 includes several sensors 128 that detect the presence of a refrigerant. For example, as a refrigerant circulates through the vapor compression system 72 and components of the vapor compression system 72, such as the condenser 76 and evaporator 80, the refrigerant may leak or escape from the vapor compression system 72 and be detected by the sensors 128. The sensors 128 generally detect the presence of refrigerant that leaks from the vapor compression system 72 and send signals to the processor 86 of the control panel 82 that are indicative of the presence of the refrigerant. For example, the sensors 128 may be gas or vapor sensors that detect an air concentration of the refrigerant near the HVAC unit 12 and send signals to the processor 86 indicative of the detected concentrations, with "near" meaning within the HVAC unit 12, nearby the HVAC unit 12, or within a threshold distance of the HVAC unit 12 such as ten or twenty feet. Moreover, the sensors 128 may detect one or more specific compounds present in the refrigerant formulation, such as refrigerant, lubricant, additives, and/or tracers.

In the illustrated embodiment, sensor 128A is disposed near the condenser 76, sensor 128B is disposed near the evaporator 80, and sensor 128C is located in the building 10 at a point close to where the conditioned supply air 118 enters the building 10. For example, the sensor 128C may located in the ductwork 14 near the HVAC unit 12, which can facilitate power and communication wiring between the sensor 128C. Regarding positioning of the sensors 128A and 128B, the word "near" means located on, directly adjacent to, coupled to, located directly below, located immediately downstream of, positioned within inches or feet, such as five feet. With regard to the sensor 128C, the term "near" means located within feet or tens of feet of the HVAC unit 12. The sensor 128C detects a concentration of the refrigerant in the conditioned supply air 118 before it enters the conditioned interior space 101 of the building 10. Additionally, in other embodiments, more or less than three sensors 128 may be used. For example, in another embodiment, the outside HVAC system 100 may include one, two, four, or more than four sensors 128 capable of detecting the presence of the refrigerant outside of the refrigerant circuit of the vapor compression system 72. Additionally, in other embodiments, sensors 128 may be located in different positions than illustrated. For example, sensors 128 may all be located at various points within the building 10 or the HVAC unit 12.

In response to receiving the signals from the sensors 128 indicative of a refrigerant leak, the processor 86 of the control panel 82 sends signals to alter the operation of the HVAC system 100. For example, the processor 86 may execute instructions 133 that are stored on the memory 88, and execution of the instructions 133 may cause the processor 86 to take various actions in response to the signals from the sensors 128. For instance, when the processor 86 receives a signal from the sensors 128 indicative of the presence of the refrigerant, the processor 86 may send a signal that causes the baffles 106 of the damper 104 of the economizer 102 to open to a pre-determined position. For example, the pre-determined position may be a fully open position to allow a maximum amount of environmental air 96 into the HVAC unit 12 and building 10. For embodiments of the HVAC unit 12 that include the return air damper 110, the processor 86 may send additional signals that close the baffles 112 of the damper 110 to prevent return air 108 from being recirculated into the building 10. Additionally, for embodiments of the HVAC unit 12 that include the exhaust air damper 124, the signals sent by the processor 86 may also cause the baffles 126 of the damper 124 to open to allow the return air 108 to exit the HVAC unit 12 as exhaust air 120. For embodiments in which the building 10 includes the exhaust fan 122, the signals sent by the processor 86 may also cause the exhaust fan 122 to activate or increase in speed. In sum, the signals from the processor 86 may cause the HVAC system 100 to increase the amount of environmental air 96 delivered to the building 10, decrease the amount of return air 108 that is recirculated into the building 10, or both increase the amount of environmental air 96 delivered to the building 10 and decrease the amount of return air 108 that is recirculated into the building 10. In other words, the processor 86 may send signals that cause a ratio of environmental air 96 delivered to the building 10 to return air 108 delivered to the building 10 to increase.

Additionally, the processor 86 may provide other control signals in response to the detected refrigerant leak. For example, the processor 86 may send signals that cause the vapor compression system 72 to cease operations or direct the refrigerant into a specific portion of the vapor compression system 72. More specifically, referring briefly back to FIG. 4, the processor 86 may send signals that cause the motor 94 that drives the compressor 74 to cease operations. For example, such a signal may be sent to the VSD 92 to cease delivering power to the motor 94. Stopping the motor 94 causes the compressor 74 to stop compressing refrigerant and delivering the refrigerant to the condenser 76. As another example, signals may be sent from the processor 86 that cause the expansion valve 78 to close and for the refrigerant to be pumped into a portion of the vapor compression system 72 to which supply air stream 98 is not exposed of the vapor compression system 72, such as the condenser 76, before shutting down the vapor compression system 72.

It may be noted that, for embodiments in which the vapor compression system 72 is a heat pump, the refrigerant can be circulated through the vapor compression system in different manners than shown in FIG. 4, such that the roles of the two heat exchangers, namely the condenser 76 and evaporator 80, can be reversed. For example, the heat pump may include additional conduits and valves that enable the compressor 74 to pump the refrigerant into either an indoor heat exchanger or an outdoor heat exchanger during normal operation, depending on the heating and cooling targets for the building 10. For such embodiments, in response to detecting a refrigerant leak, the processor 86 may provide suitable control signals to pump and trap the refrigerant in the outdoor heat exchanger, regardless of whether the outdoor heat exchanger is operating to condense or evaporate refrigerant in the vapor compression cycle of the heat pump.

Returning to FIG. 5, it should also be noted that the processor 86 may send signals to alter operation of the HVAC unit 12 when the signals received from the sensors 128 are indicative of the concentration of the refrigerant exceeding a threshold. For instance, the threshold may be a value stored on memory 88. When the signals from the sensors 128 are indicative of the refrigerant concentration being greater than the threshold, the processor 86 may send the signals that alter operational characteristics of the HVAC unit 12. For instance, as described above, the baffles 106, 112, and 126 may be adjusted, and the vapor compression system 72 may be shut down.

Furthermore, the dampers 104, 110, and 124, may be open or closed to varying degrees by the processor 86 based on the signals from the sensors 128. For example, the processor 86 may send signals that cause the baffles 106, 112, and 126 to be adjusted to specific positions based on the concentration of refrigerant indicated by signals from the sensors 128. That is, in response to a signal from the sensors 128 indicative of a refrigerant concentration that is greater than a predetermined threshold, the processor 86 may send a signal that causes the baffles 106 of the economizer 102 to open to a first position, while in response to signals indicating a concentration less than the predetermined threshold, the processor 86 may send a signal that causes the baffles 106 to open or close to a different position. For instance, the greater the detected concentration of refrigerant, the further the damper 104 may be opened to allow for more environmental air 96 to enter the HVAC unit 12 and the building 10. Similarly, the baffles 112 and 126 may be opened or closed to varying degrees based on the detected concentration of the refrigerant.

Additionally, in certain embodiments, the processor 86 may send signals to cause the motor 116 to operate at a faster speed, which causes the supply fan 114 to supply a greater flowrate of air to the conditioned interior space 101 of the building 10. For example, when only environmental air 96 is being supplied to the building 10, such as when damper 110 is completely closed and the damper 104 is open, the supply fan 114 may be used to supply the environmental air 96 to the conditioned interior space 101 of the building 10. For embodiments of the HVAC system 100 that lack either the damper 110 or the damper 124, and embodiments that lack both the damper 110 and the damper 124, the amount of environmental air 96 supplied to the building 10 can still be increased in response to a detected refrigerant leak. For example, the damper 104 of the economizer 102 may be opened, and the supply fan 114 may be operated at a faster speed.

In certain embodiments, the processor 86 may also send signals that cause an alarm or notification to be generated. In certain embodiments, the control panel 82 may be equipped with suitable output devices 134 to generate an alarm to occupants of the building 10 to notify them of the refrigerant leak. The output devices 134 may include speakers, display panels, sirens, or a combination thereof. In other embodiments, the control panel 82 may be communicatively coupled to an alarm system 135 of the building 10. Additionally, the processor 86 may send signals to a network 136. Via the network 136, the processor 86 may send signals to cause notifications and/or alarms on other electronic devices 138, such as computers, tablets, or phones. For example, the electronic devices 138 may receive emails, phone calls, text messages, or other forms of notifications based on signals sent from the processor 86. When a concentration of refrigerant is detected that exceeds a threshold, which may be different than the threshold discussed above, the processor 86 may send a signal that causes the output devices 134 and/or the alarm system 135 of the building 10 to activate. Moreover, when a concentration of the refrigerant that exceeds a threshold is detected, the processor 86 may send a signal to send a notification such as an email, text message, or phone call, to an electronic device 138. In certain embodiments, such a signal may be sent via a wireless transceiver 140 of the control panel 82 that is communicatively coupled to the processor 86. Additionally, the processor 86 may send a signal that causes the transceiver 140 to send a signal that causes an occupant, a technician, an owner, or another person to receive an email, text message, or phone call notifying them of the refrigerant leak.

Figure 6:
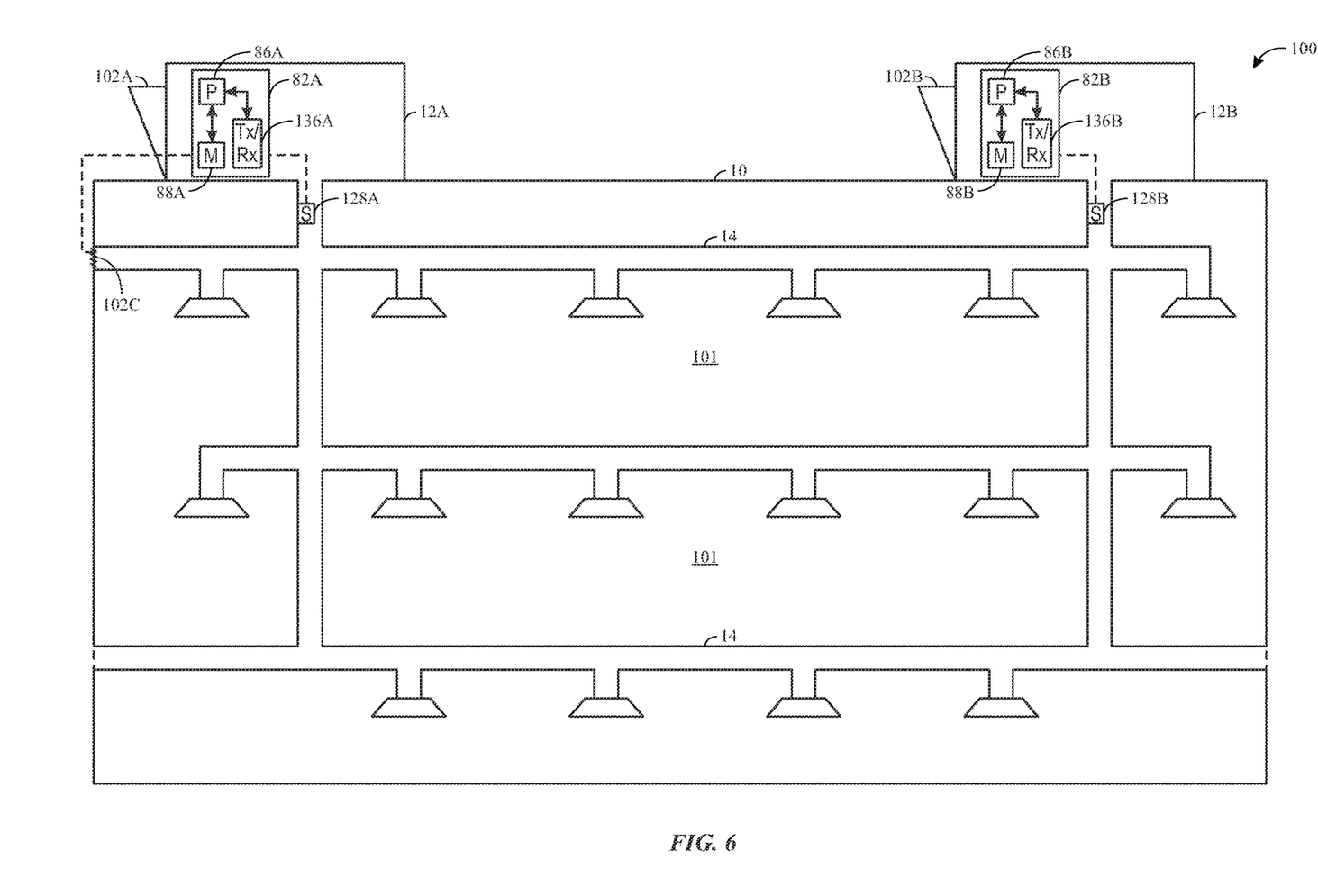
FIG. 6 is a schematic diagram of another HVAC system that includes more than one outdoor unit, each having a respective economizer, in accordance with embodiments described herein.

For embodiments of the HVAC system 100 that include more than HVAC unit 12, signals sent by the processor 86 may cause additional changes to operations of the HVAC system 100 to occur. FIG. 6 is a schematic diagram of such an embodiment of the HVAC system 100. As illustrated, the HVAC system 100 includes two outdoor packaged units: HVAC units 12A and 12B, similar to the embodiment of the HVAC unit 12 illustrated in FIG. 5. In particular, the HVAC units 12A and 12B include respective economizers 102A and 102B that can supply environmental air to the conditioned interior space 101 of the building 10, as discussed above. The illustrated HVAC units 12A and 12B each include respective control panels 82A and 82B having processors 86A and 86B and memory 88A and 88B, and these control panels 82A and 82B may be communicatively coupled to one another to coordinate operation. For instance, the control panels 82A and 82B may be communicatively coupled to one another via a wired or wireless connection. As additionally illustrated, the ductwork 14 includes an economizer 102C that is communicatively coupled to the processor 86A and may also be used to supply environmental air to the building 10. In certain embodiments, the HVAC unit 12A or 12B may not include an economizer 102, and only one HVAC unit will introduce environmental air 96 into the conditioned interior space 101 of the building 10. Furthermore, in embodiments in which the ductwork 14 of the building 10 includes an economizer, the HVAC units 12A and 12B may both not include an economizer 102.

For the embodiment illustrated in FIG. 6, the ductwork 14 of the building 10 includes sensors 128A and 128B that are capable of detecting the presence and/or concentration of a refrigerant within the conditioned interior space 101 of the building 10. For instance, one or both of the HVAC unit 12A and 12B may leak refrigerant, and the leaking refrigerant may be detected by the sensors 128A and/or 128B. Additional sensors 128A and 128B may be included in the ductwork 14, HVAC unit 12A, and/or HVAC unit 12B. Signals generated by the sensors 128A and 128B may be received via processors 86A and 86B of control panels 82A and 82B in the manner described above, with regard to FIG. 5.

In the event signals received from the sensors 128A and 128B are indicative of the presence of refrigerant, operation of the HVAC units 12A and 12B may be altered. For example, since the control panels 82A and 82B of the HVAC units 12A and 12B may be communicatively coupled to one another, the processors 86A and 86B may exchange sensor data and instructions. Additionally, in certain embodiments, the sensors 128A and 128B may be communicatively coupled to the processors 86A and 86B of the both control panels 82A and 82B. For instance, the processor 86A of the HVAC unit 12A may receive signals generated by sensor 128B, which is more closely located to HVAC unit 12B. When the sensor 128B sends a signal indicative of a refrigerant concentration, both the processor 86A of the HVAC unit 12A and the processor 86B of the HVAC unit 12B may send signals that respectively cause the operation of the HVAC units 12A and 12B to change. For example, in response to receiving a signal from the sensor 128A or 128B, the processor 86A or 86B may provide signals that deactivate the vapor compression system of one or both HVAC units 12A or 12B and adjust the economizers 102A, 102B, and/or 102C to a more opened position, such that a greater flow rate of environmental air 96 may be received and introduced into the conditioned interior space 101 of the building 10.

For example, in certain embodiments, based on the signal from the sensor 128B, the HVAC unit 12A may continue to operate in the same manner as before the signal from the sensor 128B is received by the processors 86A and 86B. That is, while the HVAC unit 12B may cease normal operation and/or take in additional environmental air 96, the HVAC unit 12A may continue to supply the building 10 with conditioned air. Alternatively, the processor 86A of the HVAC unit 12A may send signals that alter the operation of both HVAC units 12A and 12B. For instance, the processors 86A and 86B may provide signals that adjust economizers 102A, 102B, and 102C such that even more environmental air 96 is delivered to the conditioned interior space 101 of the building 10. For example, the processor 86A of the HVAC unit 12A may provide such control signals based on a signal from the sensor 128A or 128B being indicative of a refrigerant concentration that is greater than a threshold. Additionally, the processors 86A and/or 86B may determine what corrective actions or measures to take, if any, based on the concentration indicated by the signal from sensor 128A and/or 128B. For example, for a specific concentration value or range of concentration values, the processor 86 may send a signal that affects the operation of the HVAC unit 12.

In certain embodiments, the processor 86A of the HVAC unit 12 may also provide control signals based on at least in part on action taken by the processor 86B of the HVAC unit 12B. For example, both the control signals sent by the processor 86B of the HVAC unit 12B and the measurement signals from the sensor 128B may be provided by a transceiver 140B and received by the processor 86A of the HVAC unit 12 via a transceiver 140A. The processor 86A of the HVAC unit 12 may determine a refrigerant concentration based on the received signal from sensor 128B, and the processor 86A may determine how the operation of the HVAC unit 12B will be changed in response. Accordingly, the processor 86A of the HVAC unit 12A may send signals to alter the operation of HVAC unit 12A, HVAC unit 12B, or a combination thereof. For instance the processor 86A of the HVAC unit 12A may send a control signal that causes the economizer 102A and/or 102C to take in more environmental air 96 in response to receiving a signal from the HVAC unit 12B indicating deactivation of the vapor compression system of the HVAC unit 12B. Additionally, such a determination may also be based on a signal from the sensor 128B associated with HVAC unit 12B. For instance, the processor 86A of the HVAC unit 12A may cause the economizer 102A and/or 102C to open more to allow the HVAC unit 12A to receive more environmental air 96, when either the vapor compression system of the HVAC unit 12B is shut down, or when a refrigerant concentration that equals or exceeds a threshold value is indicated by sensor 128B, or a combination thereof.

Indeed, the HVAC system 100 may continue to provide conditioned air the building 10 even after the operation of an HVAC unit has been changed. For instance, as described above, if the operation of HVAC unit 12B is modified in response to signals received from the sensor 128B, the HVAC unit 12A may continue to operate in the same manner as before the HVAC unit 12B was shut down. Alternatively, the operation of the HVAC unit 12A may be altered so that the HVAC unit 12A provides more conditioned air to the building 10. For example, when the environmental air 96 is warmer than room temperature, the processor 86A may instruct the HVAC unit 12A to increase cooling to counteract the warm environmental air 96 being delivered to the building 10 by the economizer 102B of the HVAC unit 12B.

The efficacy of actions taken in response to detecting the presence of refrigerant may also be monitored for effectiveness over time. For example, the economizer 102A of HVAC unit 12A may have been partially opened in response to a refrigerant concentration detected by the sensor 128A. At another time, another signal from the sensor 128A may be received by the processor 86A, and the processor 86A may determine whether the signal from the sensor 128A is indicative of an increase or decrease in the refrigerant concentration compared to the earlier signal. When the concentration is determined to have increased, the processor 86A may send additional control signals to take further action. For example, a suitable control signal may be sent to further open the economizers 102A, 102B, and/or 102C to allow for more environmental air 96 to be supplied to the conditioned interior space 101 of the building 10. When the refrigerant concentration is determined to have decreased based on signals from the sensor 128A or 128B, earlier actions may be reversed. For example, in certain embodiments, the HVAC system 100 may resume operating conditions that were present before the refrigerant leak was detected.

Figure 7:
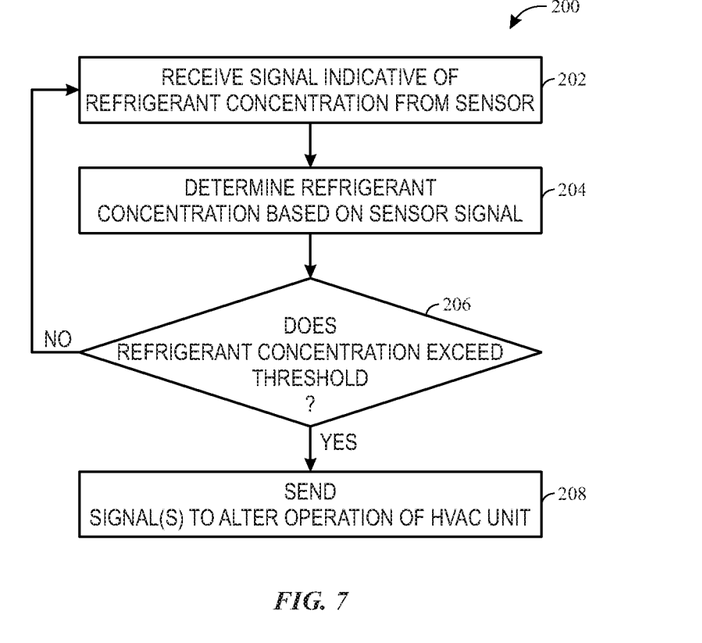
FIG. 7 is a flow diagram of a process for detecting a leaked refrigerant and controlling an HVAC system in response to the detected refrigerant leak, in accordance with embodiments described herein.

FIG. 7 is a flow diagram illustrating an embodiment of a process 200 for controlling a packaged HVAC unit based on a detected presence or concentration of a leaked refrigerant. The process 200 may be performed by a processor associated with the HVAC system 100. For instance, the process 200 may be performed by the processor 86 of the control panel 82 of the HVAC unit 12 by executing instructions 133 stored on the memory 88. Moreover, while the steps of the process 200 are described in a particular order, it should be noted that the steps of the process 200 may be performed in any suitable manner. Furthermore, in certain embodiments, some of the steps described below may not be completed during performance of the process 200.

For the illustrated embodiment, at block 202, the processor 86 receives a signal regarding a refrigerant from a sensor 128. For instance, the sensor 128 may detect a concentration of refrigerant present in the air near the sensor 128 and send a signal to the processor 86 that is indicative of the concentration of the refrigerant. At block 204, the processor 86 determines the concentration of the refrigerant based on the signal received from the sensor 128. The signals from the sensor 128 may be received and processed by the processor 86 at times when the supply fan 114 is not running and the HVAC unit 12 is in an off-cycle. However, the signals may also be received and processed by the processor 86 during active operation of the HVAC unit 12. At block 206, the processor 86 may determine whether the refrigerant concentration exceeds a threshold value. The threshold value may be a predetermined value stored on the memory 88. When the processor 86 determines that the concentration of the refrigerant does not exceed the threshold value, the processor 86 may continue to receive data from the sensor 128 to monitor for a refrigerant leak, as indicated by block 202.

However, at block 208, when the processor 86 determines that the refrigerant concentration exceeds the threshold value, the processor 86 may send one or more control signals that alter the operation of one or more HVAC units 12 of the HVAC system 100. As discussed above, the control signals may cause dampers in the HVAC unit 12 to open or close to various positions. For instance, as illustrated in FIG. 5, damper 104 of the economizer 102 may be adjusted. For example, the damper 104 may be opened to a fully open position or opened to a specific position corresponding to the determined refrigerant concentration. In other words, the control signals from the processor 86 may cause the HVAC unit 12 to receive and direct a greater volume of environmental air 96 into a conditioned interior space 101 of the building 10. In certain embodiments, as discussed above, the control signals may also cause the HVAC unit 12 to block the recirculation of return air 108 back into the conditioned interior space 101 of the building 10. For instance, the control signals may cause the damper 110 to be partially or completely closed. In certain embodiments, the control signals from the processor 86 may also drive the refrigerant still present in the refrigerant circuit into a particular portion or component of the vapor compression system 72. For example, based on control signals from the processor 86, the expansion valve 78 may be closed, and the refrigerant may be pumped into the condenser 76 via the compressor 74, which may be any suitable type of compressor, such as a centrifugal compressor, scroll compressor, rotary compressor, screw compressor, or reciprocating compressor. In certain embodiments, the processor 86 may also send suitable control signals to shut down the vapor compression system 72. Moreover, in certain embodiment, control signals from the processor 86 may also cause the supply fan 114 to operate at a faster speed, a slower speed, or cause the supply fan 114 to cease operation.

While only certain features and embodiments of the present disclosure have been illustrated and described, many modifications and changes may occur to those skilled in the art without materially departing from the novel teachings and advantages of the subject matter recited in the claims. For instance, the modifications and changes may include variations in sizes, dimensions, structures, shapes and proportions of the various elements, values of parameters such as temperatures or pressures, mounting arrangements, use of materials, colors, orientations, and the like. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilating, and air conditioning (HVAC) system comprising:
   a first HVAC unit having a first economizer comprising a damper having at least one baffle, wherein the first economizer is configured to control a first flow of environmental air into the HVAC system;
   a first sensor configured to measure a first leaked refrigerant concentration within the HVAC system;
   a first controller communicatively coupled to the first sensor and the first economizer, wherein the first controller is configured to adjust the at least one baffle of the first economizer to increase a first ratio of the first flow of environmental air relative to a first flow of return air from a conditioned interior space of a building when the first sensor measures the first leaked refrigerant concentration above a predetermined threshold concentration;

a second HVAC unit, wherein the second HVAC unit comprises a second economizer configured to control a second flow of environmental air into the HVAC system;

a second sensor configured to measure a second leaked refrigerant concentration near the second HVAC unit; and a second controller communicatively coupled to the second sensor and the second economizer, wherein the second controller is configured to increase a second ratio of the second flow of environmental air relative to a second flow of return air from the conditioned interior space of the building when the second sensor measures the second leaked refrigerant concentration above the predetermined threshold concentration.

2. The HVAC system of claim 1, wherein the first controller of the first HVAC unit and the second controller of the second HVAC unit are communicatively coupled, wherein the first controller is configured to increase the second ratio of the second flow of environmental air relative to the second flow of return air when the first sensor measures the first leaked refrigerant concentration above the predetermined threshold concentration.

3. The HVAC system of claim 1, wherein the first sensor is disposed upstream of supply ductwork of the HVAC system and is configured to measure the first leaked refrigerant concentration in conditioned air before the conditioned air enters the supply ductwork of the HVAC system.

4. The HVAC system of claim 1, wherein the HVAC system comprises an alarm and the first controller is configured to activate the alarm when the first sensor measures the first leaked refrigerant concentration above the predetermined threshold concentration.

5. The HVAC system of claim 1, wherein the first controller is configured to send a notification to an electronic device when the first sensor measures the first leaked refrigerant concentration above the predetermined threshold concentration.

6. A heating, ventilating, and air conditioning (HVAC) system comprising:

a first HVAC unit, wherein the first HVAC unit comprises:

an economizer comprising a damper having at least one baffle, wherein the economizer is configured to control a flow of environmental air into the HVAC system;

a first sensor configured to measure a first leaked refrigerant concentration within the HVAC system;

a first controller communicatively coupled to the first sensor and the economizer, wherein the first controller is configured to adjust the at least one baffle of the economizer to increase a ratio of the flow of environmental air relative to a flow of return air from a conditioned interior space of a building when the first sensor measures the first leaked refrigerant concentration above a predetermined threshold concentration; and a second HVAC unit, wherein the second HVAC unit comprises:

a second sensor configured to measure a second leaked refrigerant concentration near the second HVAC unit;

a second controller communicatively coupled to the second sensor and the first controller, wherein the first controller is configured to increase the ratio of the flow of environmental air relative to the flow of return air when the second sensor measures the second leaked refrigerant concentration above the predetermined threshold concentration.

7. The HVAC system of claim 6, wherein the second HVAC unit does not include a respective economizer.

8. The HVAC system of claim 6, wherein the second sensor is disposed within ductwork of the conditioned interior space.

* * * * *